W. DIETER.
STEP BEARING.
APPLICATION FILED OCT. 31, 1916.

1,294,633.

Patented Feb. 18, 1919.

WITNESSES:
René Bruine
T. Wallace

INVENTOR
William Dieter,
By Attorneys,
Chaser, Dunk & Myers

UNITED STATES PATENT OFFICE.

WILLIAM DIETER, OF BROOKLYN, NEW YORK, ASSIGNOR TO E. W. BLISS COMPANY, OF BROOKLYN, NEW YORK, A CORPORATION OF WEST VIRGINIA.

STEP-BEARING.

1,294,633.      Specification of Letters Patent.      Patented Feb. 18, 1919.

Application filed October 31, 1916. Serial No. 128,684.

*To all whom it may concern:*

Be it known that I, WILLIAM DIETER, a citizen of the United States of America, residing in the borough of Brooklyn, county of Kings, city and State of New York, have invented certain new and useful Improvements in Step-Bearings, of which the following is a specification.

This invention relates to the mounting of a vertical spindle or pivot such as those for the outer ring of a gyroscope, whereby to secure a free and frictionless step bearing for such pivot.

The invention is shown in its preferred form in the accompanying drawings, wherein,—

Figure 1:
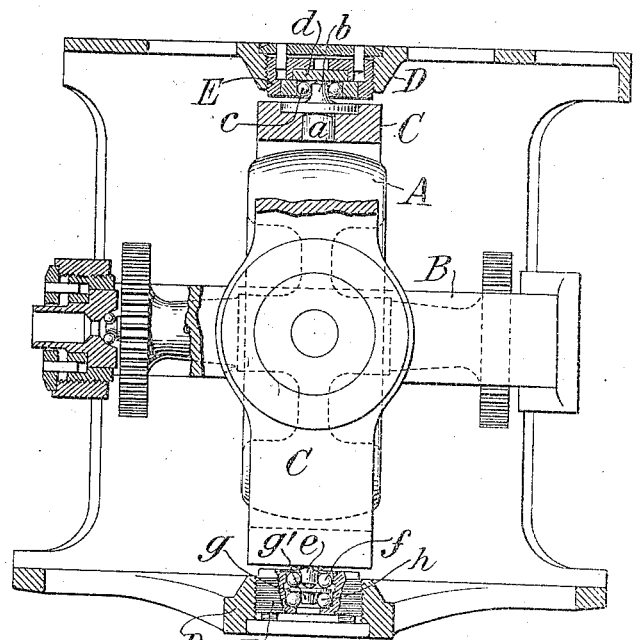
Figure 1 is an elevation, partly in vertical section, through the pivotal bearings of the outer ring of a gyroscope.
Figure 2:
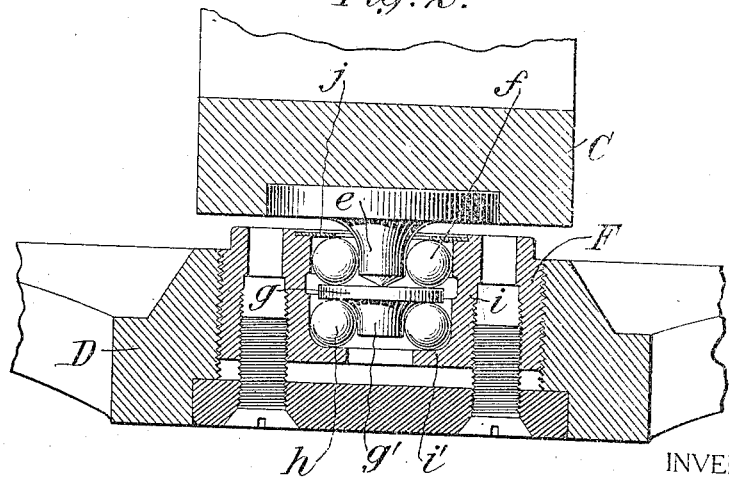
Fig. 2 is a vertical section through the lower pivotal bearing, on a larger scale.

Referring to the drawings, A is the flywheel of the gyroscope, B is the inner ring in which the fly-wheel is pivoted, and C is the outer ring carrying the inner ring and being itself pivoted on a vertical axis to any suitable support shown at D. These parts are all of the customary construction as heretofore used in gyroscopes for steering automobile torpedoes.

It is customary to provide ball bearings for the pivotal connections of the rings or gimbals. These bearings are commonly constructed in the manner shown for the upper bearing in Fig. 1, where the ring C is fitted with a stud *a* which is best made of hardened steel and is formed with the pivot *b* which enters within a series of balls *c* which are confined in an annular ball race or recess in the pivotal portion of the support D, this portion being for convenience made as a separate plug E and having a hardened plate *d* just opposite the pointed end of the pivot *b*.

The same construction as heretofore used for the bottom pivot or step bearing has not proven altogether satisfactory, and the present invention aims to provide an improved construction of such lower bearing.

The lower bearing is constructed like the upper one, with a central pivot *e* of hardened steel which turns within a series of balls *f*, and the pointed end of which rests against a plate *g* also preferably of hardened steel, which in turn rests upon a series of balls *h*, being centered within the balls by means of a boss *g'* which enters within the series of balls. The balls turn freely in a ball race or cup *i*, the lower portion *i'* of which carries the weight of the balls. The balls are held against vertical displacement by a sheet metal disk *j* which is let into the top of the cup *i*, its peripheral edge being confined by turning in the metal of the cup against it in a well-known manner. The cup *i* is preferably formed as part of a screw plug F which is fastened adjustably in the supporting frame D in the usual manner.

By means of the described construction the weight of the gyroscope is carried on the point of the hardened pin *e* which rests concentrically upon the disk *g*, which is free to turn on the balls *h*. The turning of the gimbal normally rotates the balls *f* by the contact of the sides of the pin *e* with these balls, and their rotation tends to turn the disk *g* so that the latter ordinarily rotates with the pivot pin, but at a slower speed.

The disk *g*, with its hub *g'*, constitutes a small separate part which is easily hardened by tempering. The improved construction of step bearing is ideally free from friction and wear, while holding the gimble so accurately centered as to avoid any lost motion.

The series of balls *c*, *f* and *h* are of such number as to completely fill the respective ball races, and are preferably mounted therein without any cages or ball retainers.

I claim as my invention:—

1. A step-bearing comprising a step pivot, balls centering said pivot, a rotatable disk on which the pointed end of the pivot rests, and an anti-friction support for the disk.

2. A step-bearing comprising a step pivot, balls centering said pivot, a rotatable disk on which the pointed end of the pivot rests, and balls supporting and centering said disk.

3. A step-bearing comprising a step pivot, a rotatable disk upon which the pointed end of the pivot rests, balls beneath said disk supporting it, and balls surrounding and centering said pivot and supported on said disk.

4. A step-bearing comprising a cup forming a ball race, a series of balls therein, a disk resting on said balls having a hub entering within the series of balls, a pointed pivot resting centrally on said disk, and balls in said cup surrounding said pivot.

5. A step-bearing comprising a cup forming a ball race, a series of balls therein, a disk resting on said balls having a hub entering within the series of balls, a pointed pivot resting centrally on said disk, and balls in said cup surrounding said pivot and resting on said disk.

6. In a gyroscope, a pivotal bearing comprising a step pivot, balls centering said pivot, a rotatable disk on which the pointed end of the pivot rests, and an anti-friction support for the disk.

7. In a gyroscope, a pivotal bearing comprising a cup forming a ball race, a series of balls therein, a disk resting on said balls having a hub entering within the series of balls, a pointed pivot resting centrally on said disk, and balls in said cup surrounding said pivot.

In witness whereof, I have hereunto signed my name in the presence of two subscribing witnesses.

WILLIAM DIETER.

Witnesses:
THOMAS F. WALLACE,
BURTIS F. VAUGHAN.